United States Patent [19]
Cody

[11] 4,451,572
[45] May 29, 1984

[54] PRODUCTION OF SURFACE MODIFIED ZEOLITES FOR SHAPE SELECTIVE CATALYSIS

[75] Inventor: Ian A. Cody, Baton Rouge, La.
[73] Assignee: Exxon Research and Engineering Co., Florham Park, N.J.
[21] Appl. No.: 477,434
[22] Filed: Mar. 21, 1983

Related U.S. Application Data

[63] Continuation-in-part of Ser. No. 331,262, Dec. 16, 1981, Pat. No. 4,390,414.
[51] Int. Cl.$^3$ .................... B01J 29/12; B01J 31/02
[52] U.S. Cl. ................................. 502/62; 502/74; 260/448 C
[58] Field of Search ................ 502/62, 74, 79; 260/448 C

[56] References Cited

U.S. PATENT DOCUMENTS

| | | | |
|---|---|---|---|
| 2,722,504 | 11/1955 | Fleck | 196/52 |
| 3,207,699 | 9/1965 | Harding et al. | 252/430 |
| 3,213,156 | 10/1965 | Harding et al. | 260/683.2 |
| 3,280,096 | 10/1966 | MacKenzie | 260/94.9 |
| 3,309,892 | 6/1968 | Sanford et al. | 252/430 |
| 3,644,220 | 2/1972 | Kearby | 252/442 |
| 3,658,696 | 4/1972 | Shively et al. | 208/310 |
| 3,682,996 | 8/1972 | Kerr | 260/448 |
| 3,698,157 | 10/1972 | Allen et al. | 55/67 |
| 3,724,170 | 4/1973 | Allen et al. | 55/67 |
| 3,725,302 | 4/1973 | Shimely et al. | 252/431 |
| 3,726,809 | 4/1973 | Allum et al. | 252/431 |
| 3,980,586 | 9/1976 | Mitchell | 252/455 |
| 4,002,697 | 1/1977 | Chen | 260/671 |
| 4,053,534 | 10/1977 | Mitchell et al. | 260/683 |
| 4,080,284 | 3/1978 | Mitchell | 208/111 |
| 4,090,981 | 5/1978 | Rodewald | 252/455 |
| 4,100,219 | 7/1978 | Rodewald | 260/682 |
| 4,138,363 | 2/1979 | Hertzenberg et al. | 252/430 |
| 4,376,036 | 3/1983 | Garwood et al. | 208/111 |
| 4,402,867 | 9/1983 | Rodewald | 252/455 Z |

OTHER PUBLICATIONS

"Sorption Behavior of Silanated H-Mordenite", Barrer, et al., J.C.S. Faraday 1, 74, p. 1871, (1978).
"Modified Zeolites—Part 1, Dealuminated Mordenites and Their Silanation", Barrer, et al., J.C.S. Faraday 1, 74, p. 2786, (1978).
"Modified Zeolites—Part 2, Sorption by Dealuminated Silanated Mordenites", Barrer, et al., J.C.S. Faraday 1, 74, p. 2798, (1978).
"Study of the Surface and Bulk Hydroxyl Groups of Silica by Intra-Red Spectra and $D_2O$ Exchange", Davydov, et al., Trans. Farad. Soc. 60, p. 2254, (1964).
"Studies of the Hydrogen Held by Solids VIII, The Decationated Zeolites", Uytterhoeven, et al., J. Phys. Chem. 69, #6, p. 2117, Jun. 1965.
"Modification of HY Zeolite by Reaction with Tetramethylsilane", McAteer & Rooney, ACS Advances in Chem. 121, 1973, p. 258.
"Reactions of Chloromethyl Silanes with Hydrated Aerosil Silicas", Armistead & Hockey, Trans. Farad. Soc. 63, p. 2549, (1967).
"Adsorption and Reaction of Methylchorosilanes at an 'Aerosil' Surface", Evans & White, J. Catalysis 11, 336-341, (1968).
"Reactions of Chlorosilanes with Silica Surfaces", Hair & Hertl, J. Phys. Chem. 73, #7, Jul. 1969, p. 2372.
"Sorption of Hydrocarbons and Water in Silanated and Unsilanated Partial H-Forms of Zeolite Y", Barrer et al., JCS Faraday I, 75, (9) 2229, (1979).
"Notes—The Strength of Bunsted Acid Centers in NaHY Synthetic Zeolites", Bielanski et al., J. Catalyses 37, 383, (1975).
"Silanation of Zeolites", Barrer, et al., Molecular Sieves II, ACS Symposium Series, vol. 40, Chapter 22, pp. 258-270, 1977.

*Primary Examiner*—Carl F. Dees
*Attorney, Agent, or Firm*—Joseph J. Allocca

[57] ABSTRACT

A method is described for producing a surface modified catalytically active zeolite which method comprises chemically modifying a zeolite by reaction, under dry, anhydrous conditions, with an organosilane wherein the starting zeolite has some sites available for reacting with the organosilane and some protected sites which are prevented from reacting with said organosilane which remain to be the catalytically active sites. The organosilane chosen should be capable of entering into the channels of the zeolite and chemically reacting with the available sites present therein, as well as reacting with the available hydroxyl groups present on the external surface of said zeolite.

19 Claims, 5 Drawing Figures

PRODUCTION OF SURFACE MODIFIED ZEOLITES FOR SHAPE SELECTIVE CATALYSIS

CROSS-REFERENCE TO RELATED APPLICATION

This application is a continuation-in-part of copending application U.S. Ser. No. 331,262 filed Dec. 16, 1981 now U.S. Pat. No. 4,390,414.

DESCRIPTION OF THE INVENTION

A method is described for producing a surface modified catalytically active zeolite which method comprises chemically modifying a zeolite by reaction, under dry, anhydrous conditions, with an organosilane wherein the starting zeolite has some sites available for reacting with the organosilane and some protected sites which are prevented from reacting with said organosilane which remain to be the catalytically active sites. The organosilane chosen should be capable of entering into the channels of the zeolite and chemically reacting with the available sites present therein, as well as reacting with the available hydroxyl groups present on the external surface of said zeolite.

In order to generate a surface which can be silylated and which is also catalytically active (i.e. has protected sites) the "as crystallized" zeolite should be partially exchanged with a decomposable ion such as $NH_4^+$, calcined in air or an inert atmosphere to decompose the decomposable ion, at an elevated temperature on the order of about 180° C. and greater, preferably about 200° C. and greater, then cooled. Either or both of the calcination/cooling should be in a moist atmosphere. The zeolite is then heated in a dry environment at an elevated temperature on the order of about 300° C. or greater and the surface is maintained in a dry state and contacted under anhydrous conditions with the organosilane at between 25°-500° C.

The chemically modified zeolite may be loaded with a catalytically active hydrogenating metal component. Preferably, the organosilane modified zeolite, either before or after the deposition of the catalytic metal component may be heated to an elevated temperature in an inert or reducing atmosphere. This heating may be conducted as an independent operation or may be conducted in situ in the catalytic environment in which the surface modified zeolite is to be employed. In either case, the atmosphere employed should be inert or reducing and is preferably hydrogen or contains hydrogen. Such deliberate or in situ heating is conducted to form a stable surface resulting from condensation/polymerization of the silylatedsurface. The temperatures chosen for imparting this stability are usually at or above the temperature of the subsequent catalytic process, but, preferably about 300° to 500° C., more preferably 400° to 500° C.

The chemically modified zeolite prepared by the present method is an effective hydrodewaxing catalyst and should also find application in the production of high octane gasoline by selective paraffin cracking, in the production of low pour point distillate fuel oils, in the conversion of methanol into gasoline, in Fischer-Tropsch synthesis, in paraxylene isomerization and ethyl benzene synthesis and for the preferential acid catalyzed reactions of linear or slightly branched paraffins or olefins, etc.

BACKGROUND

Silylation of surfaces has been practiced extensively since the early 1950's. U.S. Pat. No. 2,722,504 to Fleck described methods for improving the organophilicity of catalysts and adsorbents by treating with compounds of the general type $R_1R_2R_3SiX$ where $R_1R_2$ and $R_3$ may be organic non-hydrolyzable moieties and x is a hydrolyzable group including halogens, alkoxy and other groups which separate from silicon in the presence of water. Though Fleck did not describe the reaction, the surface hydroxyls of insulating surfaces like silica, alumina, magnesia and zeolites, may interact with such silanes in the following way:

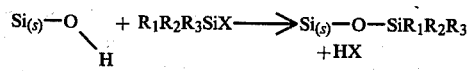

(s) denotes a surface silicon

Many variations on this reaction with other silicon reagents and other surfaces but particularly silica have been studied, see: "Study of the Surface and Bulk Hydroxyl Groups of Silica by Infra-red Spectra and $D_2O$ Exchange", Kiselev et al, Trans. Farad. Soc. 60, 2254 (1964); "Reactions of Chlorosilanes with Silica Surfaces" Hair et al, J. Phys. Chem. 73 #7, 2372 July 1969; "Reactions of Chloromethyl Silanes with Hydrated Aerosil Silicas" Armestead et al, Trans. Farad. Soc. 63, 2549 (1967); "Adsorption and Reaction of Methylchlorosilanes at an 'Aerosil' Surface" Evans et al, J. Catalysis 11, 336-341 (1968).

More recently, patents have been issued pertaining to the reactions of organosilanes with zeolites and the subsequent benefits of this treatment.

U.S. Pat. No. 3,682,996 issued to Kerr claims a zeolite ester product (more properly described as a silicon ether) derived from the reaction between a silane containing an available hydrogen atom and an alumino-silicate zeolite.

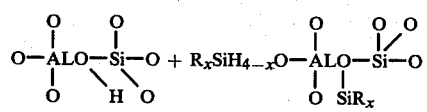

where x is between 1 and 4 and where R is independently at least one organic radical, suitably aryl, alkyl, acyl, aralkyl but preferably alkyl because the pore structure will more readily accept alkylsilanes than arylsilanes. Apart from these classes of silanes Kerr makes a reference to one other silane not fitting this formula, hexamethyl disilazane. Kerr does not disclose or claim usage of halosubstituted silanes.

The reactions described by Kerr all occur under vacuum conditions wherein the outgassed H form zeolite is contacted with pure organosilane vapor or liquid at various temperatures. Kerr discloses, but does not demonstrate or claim, that the silylated zeolite may be used in catalytic applications, including "certain shape selective catalyzed reactions".

U.S. Pat. No. 3,726,309 to Allum claims a product derived from the reaction of an inorganic material containing hydroxyl groups, including aluminosilicates, modified by treatment with an organic radical substituted silane. Bound silicon ethers are formed by reaction with the surface hydroxyl groups.

U.S. Pat. No. 3,658,696 to Shively claims an improved separation process resulting from the reactions of zeolite molecular sieves with organosilanes. The replacement of OH radicals on the zeolite surface with silane radicals significantly affects the surface adsorption properties of the molecular sieve because the hydroxyl groups are the main centers of surface adsorption. In this instance bulky silanes were chosen which reacted with only the external surface of the zeolite.

Zhomov et al, Katal, Pererab, Uylevodorad, Syr'ya 1968 (2) 9 (from Ref. Zh. Khim 1969 abstract No. 4N196) used a methyl chlorosilane to change the properties of an aluminosilicate used to alkylate phenol with a tetrameric propylene.

U.S. Pat. No. 3,980,586 to Mitchell claims a new product resulting from a sequence of silylation, calcination and steaming of a group of materials consisting of alumina, silica alumina and aluminosilicates. Calcining continues for a sufficient time and at high enough temperatures to remove all of any introduced organic or halogen substituent (unlike Kerr, Mitchell has used a more general form of silanes which includes halogens). The amount of silane used was sufficient to achieve about 1-5% of a new $SiO_2$ layer. U.S. Pat. No. 4,080,284 to Mitchell claims the new materials to be useful for catalytic hydroconversion.

U.S. Pat. No. 4,002,697 to Chen used a silane treatment on ZSM-5 to improve the yield of p-xylene from methylation of toluene. In this instance the silane was chosen so as to interact only with the external surface.

U.S. Pat. No. 3,698,157 and U.S. Pat. No. 3,724,170 to Allen demonstrated that improved separation of $C_8$ aromatics could be achieved by contacting alumino-silicate adsorbents with organic radical or halo substituted silanes.

THE INVENTION

Figure 1:
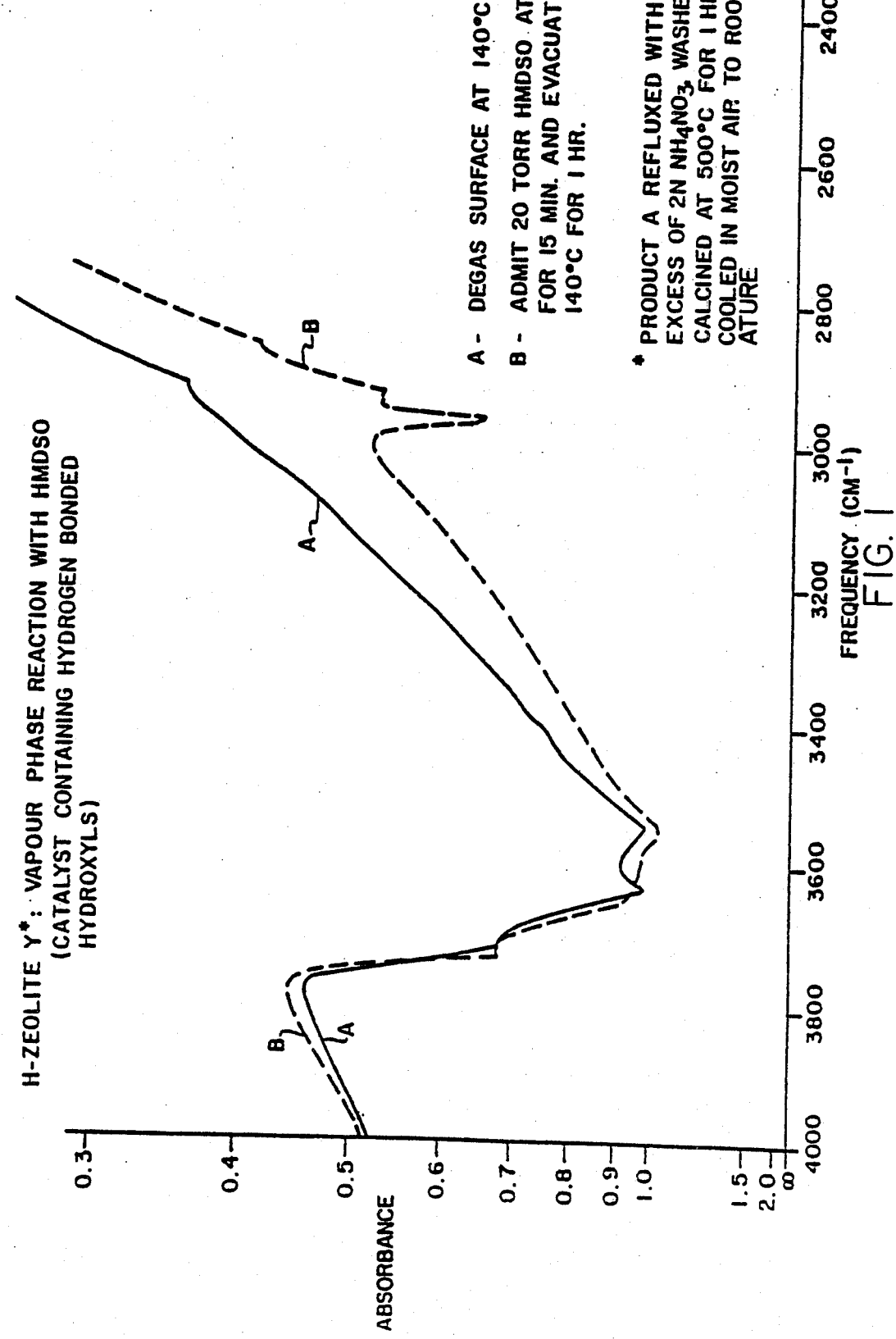
FIG. 1 shows the infrared spectrum of the vapor phase reaction of hexamethyldisiloxane, HMDSO with H-zeolite Y (containing hydrogen bonded hydroxyls).

A method is described for producing a surface modified catalytically active zeolite which method comprises chemically modifying a zeolite by reaction, under dry, anhydrous conditions, with an organosilane wherein the starting zeolite has some sites available for reacting with the organosilane and some protected sites which are prevented from reacting with said organosilane which remain to be the catalytically active sites. The organosilane chosen should be capable of entering into the channels of the zeolite and chemically reacting with the available sites present therein, as well as reacting with the available hydroxyl groups present on the external surface of said zeolite.

In order to generate a surface which can be silylated and which is also catalytically active (i.e. has protected sites) the "as crystallized" zeolite should be partially exchanged with a decomposable ion such as $NH_4^+$, calcined in air or an inert atmosphere to decompose the decomposable ion, at an elevated temperature on the order of about 180° C. and greater, preferably about 200° C. and greater, then cooled. Either or both of the calcination/cooling should be in a moist atmosphere. The zeolite is then heated in a dry environment at an elevated temperature on the order of about 300° C. or greater and the surface is maintained in a dry state and contacted under anhydrous conditions with the organosilane at between 25°-500° C.

The chemically modified zeolite may be loaded with a catalytically active hydrogenating metal component. Preferably, the organosilane modified zeolite, either before or after the deposition of the catalytic metal component may be heated to an elevated temperature in an inert or reducing atmosphere. This heating may be conducted as an independent operation or may be conducted in situ in the catalytic environment in which the surface modified zeolite is to be employed. In either case, the atmosphere employed should be inert or reducing and is preferably hydrogen or contains hydrogen. Such deliberate or in situ heating is conducted to form a stable surface resulting from condensation/polymerization of the silylatedsurface. The temperatures chosen for imparting this stability are usually at or above the temperature of the subsequent catalytic process, but, preferably about 300° to 500° C., more preferably 400° to 500° C.

The chemically modified zeolite prepared by the present method is an effective hydrodewaxing catalyst and should also find application in the production of high octane gasoline by selective paraffin cracking, in the production of low pour point distillate fuel oils, in the conversion of methanol into gasoline, in Fischer-Tropsch synthesis, in paraxylene isomerization and ethyl benzene synthesis and for the preferential acid catalyzed reactions of linear or slightly branched paraffins or olefins, etc.

The waxy oils which can be processed by the silylated zeolite of this invention are typically light middle distillates or heating oils, boiling in the range 200° C.-385° C., to heavy lube distillates and deasphalted vacuum residuum boiling up to 580° C. Preferred oils are light and middle distillate oils and raffinates, such as kerosene, lube or transformer oils.

Hydrodewaxing with the silylated zeolites is typically conducted at a temperature of about 250°-450° C., preferably 250°-380° C., the lower temperatures are preferred so as to reduce non-selective cracking. Typical pressures employed are 200-2000 psig $H_2$, preferably 300-1000 psig $H_2$ and most preferably 400-700 psig $H_2$. Feed rates may range from 0.1 to 100 LHSV, preferably 0.1 to 10. Excess gas rates may range from 1000-20,000 SCF $H_2$/BBL but preferably from 1000-5000 SCF $H_2$/BBL.

Oils used to demonstrate catalyst performance (for hydrodewaxing) are described in detail in Table 1.

TABLE 1

| | FEEDSTOCK INSPECTIONS | | | | |
|---|---|---|---|---|---|
| | Western Canadian[1] 150N | Western Canadian 600N | Primol 185 | Naphthenic Oil | Bright Stock |
| Viscosity @ 40° C., CST | 25.40 | — | 38.4 | 76.9 | — |
| Viscosity @ 100° C., CST | | | (@ 37.8° C.) | — | 26.2 |
| VI | 95 | — | 91 | 82 | — |
| Pour Point °C. | 6 | 50 | −26 | 0 | 50 |
| Density @ 15° C. | 0.870 | 0.874 | | 0.883 | 0.890 |
| Refractive Index @ 60° C. | 1.4659 | 1.4672 | 1.4626 | 1.4720 | 1.4780 |
| Saturates, wt % | 80.5 | — | 100 | — | — |
| Aromatics, wt % | 18.3 | — | 0.0 | — | — |
| Polars, wt % | 1.1 | — | 0.0 | — | — |
| Basic Nitrogen, ppm | 5 | 14.4 | 0.0 | 35 | 99.5 |
| Sulfur, wt % | 0.19 | 0.16 | 0.0 | 0.05 | 0.42 |
| GCD (°C. at % off) | | | | | |
| 5 | 344 | 412 | 317 | 385 | 466 |
| 10 | 361 | 451 | 336 | 406 | 492 |
| 30 | 395 | 476 | 382 | 439 | 549 |
| 50 | 417 | 498 | 425 | 460 | 589 |
| 70 | 436 | 522 | 457 | 480 | — |
| 90 | 459 | 541 | 494 | 507 | — |
| 95 | 472 | 556 | 509 | 557 (final) | — |
| Wax Content wt %[2] | — | 17.1 | — | | |

[1] partly solvent dewaxed at +6° C. pour point
[2] calculated for products filtered at −5° C. from 1:1 MEK/MIBK at 2:1 solvent:oil.

DESCRIPTION OF ZEOLITES

The zeolite which is surface modified (and which may or may not contain a catalytically active hydrogenating metal component depending on the application is of the faujasite type (both natural or synthetic) including zeolite X, synthetic faujasitic, zeolite Y, and the mineral faujasite itself.

The present case involves the silylation of zeolite Y. Zeolite Y has a large pore (7.4 Å) and is not known to demonstrate shape selective properties.

Zeolite Y is one of the largest known 12 ring zeolites and is used in hydrocracking applications where hydrocarbon molecules of various types and shapes are converted. One useful feature of this type of structure is that it has a 3 dimensional network of connecting supercages which not only permits organosilanes to be readily adsorbed (see: "Modification of H Y Zeolites by Reaction with Tetramethylsilane" McAteer et al, ACS Advances in Chem 121 1973, "Molecular Sieves" ed. W. M. Meier & J. B. Uytterhoeven and "Sorption of Hydrocarbons and Water in Silanated and Unsilanated Partial H-Forms of Zeolite Y" Barrer et al, J. C. S. Faraday 1 75 (9) 2221 (1979) but could potentially be a surface network that rapidly diffuses hydrocarbon (e.g. wax) molecules although these references do not teach, suggest or imply such a use.

In principle each of these faujasitic zeolite systems could be improved by silylation since each has an inherently larger pore than ZSM-5 and the systems are highly hydrophilic in their "as crystallized forms". ZSM-5 is an intermediate pore, hydrophobic zeolite that is known to be effective for catalytic dewaxing.

In the present specification a process for the surface modification of zeolites is presented, with the benefit of such modification being demonstrated by the catalytic dewaxing of waxy hydrocarbon oils.

DESCRIPTION OF ORGANOSILANES

In this invention, the zeolites are treated with organosilanes under specific conditions, explained in greater detail below, to effect condensation and polymerization.

The organosilanes employed in the preparation of the catalyst useful in the process of the present invention come from the classes:

$$Si\ R_y\ X_{4-y}\ \text{and}\ (R_w\ X_{3-w}\ Si)_2 - Z;$$

wherein:

$y = 1$ to 4; $w = 1$ to 3
R = alkyl, aryl, H, alkoxy, arylalkyl, and where R has from 1 to 10 carbon atoms; X = halide and Z = Oxygen or NH or substituted amines or amides.

Examples of useful organo silanes are: hexamethyl disilazane (HMDS), hexamethyldisiloxane (HMDSO), dichlorodimethyl silane, monochloro trimethyl silane, methoxyltrimethyl silane, N-methyl-N-trimethyl silyl trifluoro acetamide.

The organosilane found most useful in this work is hexamethyl disiloxane (HMDSO).

METHOD OF GENERATING MODIFIED ZEOLITE

The object of treating zeolite catalysts with the organosilanes is to convert the surface from a hydrophilic into a hydrophobic form and to reduce the zeolite pore size and pore volume.

If zeolites are crystallized with organic templating ions such as tetramethyl ammonium ion, they must be first treated so as to remove these species. In general, zeolites are calcined to remove organic templates and/or to create enough sites for silylation by using $NH_4^+$ ion exchange or other techniques known in the art.

The zeolite containing the organic templating agent (such as tetramethylammonium) is exchanged, prior to or after calcination to decompose the templating agent, with a decomposable cation for example with $NH_4^+$ to remove cations.

In applications which are hydrogen consuming processes it is preferable that the zeolite be loaded with a catalytically active hydrogenating metal component using a metal salt, preferably where the metal is a cation.

In such cases the conversion into the form active for silylation may also be done before metal loading, but it is preferred that the metal be loaded on an NH$_4$+ form of the zeolite prior to the calcination step which leads to the reactive form of the zeolite. The metal salt is then reduced to elemental metal using techniques known in the art. Group VI and/or VIII metals their oxides, sulfides and mixtures thereof can be used, preferably the metal. Pt and Pd are particularly useful preferably in the range 0.1 to 2.0 wt % based on dry zeolite, more preferably 0.1–1.0 wt % and most preferably 0.2–0.5 wt %.

Metal loading and ammonium exchange may also follow in some instances procedures used to increase SiO$_2$/Al$_2$O$_3$ ratio such as H$_4$ EDTA leaching or other techniques well-known in the art. Metal loading may also follow the silylating step, which is discussed in detail below, but preferably precedes the silylating step.

REACTIVE SITE GENERATION

After the zeolite has been exchanged and, when required, a metal salt has been deposited, the zeolite is then treated so as to generate sites which will react with the organosilane. The sites which so react are the "isolated hydroxyl" groups and "strained bridge" sites. For the purpose of this specification the term "reactive site" will be understood to include both types of sites.

An isolated site is a hydroxyl site which has no close neighbors so that hydroxyl-hydroxyl interactions are minimal. A "strained bridge" site is generated when close neighbor hydroxyl sites interact when heated in a dry environment causing the surface to dehydroxylate.

In zeolites which have low SiO$_2$/Al$_2$O ratios (i.e., high site densities) care must be taken to employ methods which generate the desired reactive sites while also protecting catalytically active sties.

Isolated sites can be generated by calcination of an ammonium form zeolite in a dry environment, for example, dry hydrogen, and maintaining a moisture free surface (i.e., a dry environment) at all times prior to and during silylation. Alternatively, isolated hydroxyl sites may be created by permitting minimal cation exchange thereby generating a low density of hydroxyls reducing the possibility of hydroxyl-hydroxyl interaction i.e. hydroxyl site density is controlled by the degree of cation exchange, the higher the degree of cation exchange the greater the hydroxyl site density on subsequent calcination. Another method would be to increase the silica to alumina ratio of the zeolite which also reduces site populations and minimizes interactions.

The other type of reactive sites, the strained bridge sites are generated from strongly interacting or hydrogen bonded hydroxyl sites by dehydroxylation. Hydrogen bonded hydroxyl sites are first generated by calcining an ammonium form zeolite preferably above about 180° C., more preferably above about 200° C. and by cooling after decomposition of the ammonium form to, temperatures below 100° C. Either or both of the calcination and cooling steps is conducted in a moist atmosphere, e.g. moist air, or, if both the calcination and cooling are under anhydrous conditions, the resulting zeolite is permitted to equilibrate in a moist atmosphere. If the population of hydroxyls so generated is high enough then they may be close enough to each other to interact through hydrogen bonds. As previously stated, hydroxyl site density is controlled by the extent of cation exchange, the higher the degree of cation exchange the greater the hydroxyl site density on subsequent calcination and the higher the probability of generating hydrogen bonded hydroxyls in low silica to alumina ratio zeolites, such as zeolite Y, zeolite X. Such hydrogen bonded hydroxyl sites are essentially unreactive with silylating agents. However, if this surface is again heated this time in a dry environment to temperatures of about 300° C. and above these sites collapse losing chemical water leaving behind a strained bridge site. This site is reactive with silylating agents. Dehydroxylation is schematically represented below:

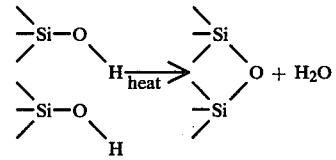

Mixtures of reactive sites (isolated hydroxyls and strained bridge sites) can be generated by varying the conditions of dryness and activation temperature.

SILYLATION

Silylation is performed by contacting the zeolite under anhydrous conditions with either vaporous or liquid organosilanes or by dissolving the organosilane in a dry non-reactive organic solvent, such as hexane, heptane, naphtha or lube oil, and contacting the solution with the zeolite, with or without the metal hydrogenation component present, at from 20° to 500° C.

If the organosilane is not reacted directly with the surface as a vapor or liquid then it may be used as an organic solution where the solvent is preferably non-polar and non-aromatic and should preferably contain no greater than about 10 ppm water. The silylating solution will contain from about 0.01 to 20% silane, preferably 1 to 5% silane (by volume). Total free water content of both the zeolite and the solvent should not exceed about 10 ppm.

For example, acetone, toluene, ethylacetate and 1,4 dioxane all react with zeolitic sites at conditions needed to form a stable silylated surface and are therefore unsatisfactory solvents whereas n-hexane, n-pentane, carbon tetrachloride, white oils and even the hydrocarbon oil feed to the catalytic process itself are satisfactory.

The concern with solvent dryness is not only that water will hydrolyse the silylating molecule because, at least for hexamethyldisiloxane (HMDSO) this occurs only slowly. The problem also is that water can interact wih the zeolite's reactive sites which could in turn alter or block the reaction of the reactive sites with HMDSO or other silylating agents (see above, hydrogen bonded hydroxyls). Surface moisture can block access by the silylating agent to the internal reactive sites thereby limiting silylation to the external reactive sites.

Silylation is preferably performed after the catalyst has been loaded with metal and following at least partial thermal decomposition (air calcination) of the NH$_4$+ sites to hydroxyl sites and complete decomposition of any organic nitrogen templating agent.

The initial reaction at room temperature with isolated sites is to possibly form a surface "ether" link through trimethylsilyl (TMS) groups like those described by Kerr in U.S. Pat. No. 3,682,996. For example, the reaction of a reactive isolated hydroxyl site with HMDSO would be:

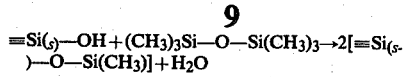

The reaction of a strained bridge sites with HMDSO could be exemplified by:

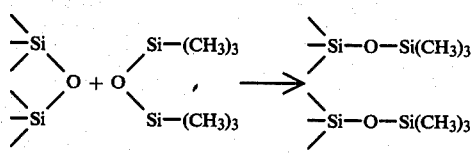

It is expected that silylated species generated by either of the above reaction sequences will experience some form of condensation-polymerization reaction as temperature increases.

A possible condensation product is:

Scheme I

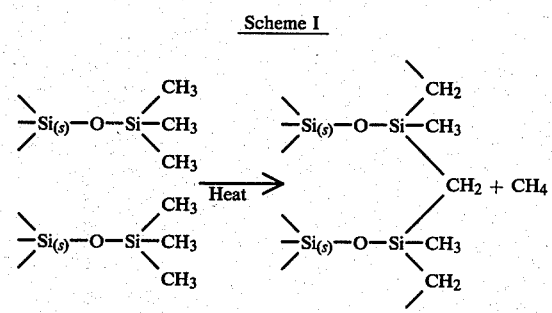

The condensed surface is expected to be stable in $H_2$ atmospheres up to 550° C. This type of surface is therefore different from the surfaces described by both U.S. Pat. No. 3,622,996 (pendant silyl groups) and Mitchell U.S. Pat. No. 3,980,586 but is similar to the secondary reaction product observed by McAteer in the reaction of tetramethyl silane with H zeolite Y. (ACS advances in Chemistry Sieves No. 121, "Molecules Sieves" Edited: Meier & Uytterhoeven).

Because of the relative ease with which the internal reactive sites can be substituted by the silane in large pore zeolites (because of the ease with which the silane can enter the pores of the zeolite) the initial silylating contact temperature may be low to moderate i.e. 25°–200° C.

The final state of the silylated surface (i.e., the degrees of condensation-polymerization) will be determined by the highest temperature that the surface experiences either during silylation, subsequent activation or when the catalyst is employed for example on oil. Condensation-polymerization reactions between neighboring silyl groups themselves and also with unreacted sites may begin at about 25° C. and become more extensive as the temperature is raised.

Condensation-polymerization may be conducted as an independent operation or may be conducted in situ in the catalytic environment (as a direct consequence of the catalytic process conducted at elevated temperatures). In either case, the atmosphere employed is inert or reducing and is preferably hydrogen or contains hydrogen, especially if hydrogen is to be used in the process. Such heating is conducted to form a stable surface. The temperatures chosen for imparting this stability are usually at or above the temperature of the subsequent catalytic process, but preferably about 300° to 500° C., more preferably about 400° to 500° C.

HYDROXYL SITE PROTECTION

Although a change in pore volume and sorption properties are very desirable and can be achieved by the silylation of reactive sites it is also important that some hydroxyl sites be protected so that ultimately the modified catalyst is active. There must be a balance between sufficient constriction and the retention of some of the catalytically active acidic hydroxyl sites.

If the organosilane used has easy access into the pores of the zeolite, complete silylation of the internal and external hydroxyl groups may be possible rendering the catalyst inactive.

In such cases methods for generating and protecting some hydroxyl sites are needed. For zeolites such as zeolite Y such protection is achieved by generating a mixed population of isolated/strained bridge hydroxyl sites (i.e., those which react with the organosilane) and hydrogen bonded hydroxyl sites which do not react strongly with organosilanes.) This is achieved by calcining the cation exchanged (e.g. $NH_4^+$) zeolite, preferably at temperatures above about 180° C., more preferably above about 200° C., and cooling to about 100° C. or lower, either or both of the calcination and cooling being conducted in a moist atmosphere, e.g. moist air, or if the calcination/cooling are in an anhydrous atmosphere, permitting the cool zeolite to equilibrate in moist atmosphere, e.g. moist air. If too many non reactive hydrogen bonded hydroxyl sites are generated (these will not react with the organosilane) the surface can be subjected to dehydroxylation conditions which result in the generation of some strained bridge sites which are reactive with the organosilane silylating agents. Any hydrogen bonded hydroxyls remaining after dehydroxylation are then available as the catalytically active hydroxyls. Other methods of protection include blocking of the potential hydroxyl site with cations. For example, a sodium form zeolite can be partially exchanged, with $NH_4^+$ salt solutions, calcined to generate isolated hydroxyl sites, treated with silylating agent under dry conditions, then reexchanged and calcined to generate new reactive hydroxyl sites.

CATALYSTS

Two series of catalysts were studied derived from Zeolite Y. The batches are designated here as material A and material A*.

Material A=Na Zeolite Y

Zeolite Y received from Union Carbide Corporation in the Na form had the following oxide composition:

$Na_2O.Al_2O_3.4.4SiO_2.8.9H_2O$ with a corresponding unit cell formula:

Material A-1

Material A was exchanged in 0.5 N $NH_4NO_3$ at reflux for 2 hr using a 10 volume excess of solution then filtered and washed in water.

The crystals were re-slurried in a two volume excess of a dilute aqueous $NH_4OH$ solution (pH 10) and an aqueous solution containing about 0.15 wt% of $Pd(NH_3)_4Cl_2$ was added dropwise over a 5 hour period at room temperature to give a nominal loading of 0.25 wt % Pd. After washing and filtering the sample was dried at 120° C. (1 hr.) i.e., the sample contained $NH_4^+$ ion.

Catalyst A-2

Calcination of A-1 at 500° C. in moist air (laboratory air with ambient humidity), 1 hour yielded an $NH_4^+$ free catalyst with the oxide composition:

$$0.45Na_2O.Al_2O_3.4.4SiO_2$$

The powder was pressed, crushed and screened to 7-14 mesh (Tyler) loaded into a reactor and reduced in $H_2$ at 400° C.

HMDSO Modified A Catalysts

Catalyst A-1M(a)

The catalyst was prepared from material A-1. The A-1 material was air calcined at 250° C., cooled in air then pressed, and screened to 7-14 mesh (Tyler) and loaded into a reactor. There it was dried in $N_2$ at 200° C. for 1 hour, then in dry $H_2$ at 200° C. for 2 hours, followed by treatment at 40° C. in 5% HMDSO/Primol 185 at 1 v/v/h for 10 h; finally, the catalyst was heated to 500° C. in $H_2$ prior to admitting feed.

Catalyst A-1M(b)

After 160 hours on stream (Western Canadian 600N) the catalyst (A-1M(a)) was cooled to 250° C. in hydrogen and a solution of 5 vol. % HMDSO was passed over the catalyst at 1 v/v/h for 5 hours. Feed was readmitted and the temperature raised to 350° C.

Material A*=Na Zeolite Y

Another sample of Zeolite Y powder was secured from Union Carbide Corporation in the Na form which had the following oxide composition $$1.1Na_2O.Al_2O_3.4.7SiO_2$$

and is herein designated material A*

Material A*-1

Material A* as received was twice exchanged by reflux in a 10 volume excess of aqueous 2 N $NH_4NO_3$ solution for 1 hr. yielding a product of the following oxide composition $$0.23Na_2O.Al_2O_3.4.7SiO_2$$

The sample was washed free of $No_3^-$ in deionized water and subsequently exchanged with a sufficient amount of a dilute solution of $Pd(NH_3)_4Cl$ to produce 0.25 wt.% Pd on dry zeolite. The sample was then washed in deionized water, oven dried at 120° C. for 1 hr and allowed to equilibrate in laboratory air at room temperature.

Catalyst A*-1

Material A*-1 was pressed, crushed and screened to 7-14 mesh (Tyler) loaded into a reactor and reduced at up to 400° C. in $H_2$.

HMDSO Modified A* Catalyst (A*-1M to A*-8M)

Each of the A* catalysts that were subsequently treated with HMDSO were all prepared in the same manner as Material A*-1 except that in some cases different concentrations of $NH_4NO_3$ were used to achieve different levels of exchange.

Like Material A*-1 they were also loaded with 0.25% Pd. A summary of the preparation steps used to make these catalysts is shown in Table 2.

TABLE 2

CONDITIONS FOR PREPARING MODIFIED A* TYPE CATALYSTS

| | $NH_4NO_3$ Exchange mol/dm | Na/Al | Si/Al | Dry Air Calcination °C./hr | Dry $H_2$ reduction °C./hr | HMDSO Treat °C.(Solvent) | $H_2$ Reduction °C. |
|---|---|---|---|---|---|---|---|
| A*-1M | 2.0 (twice) | .23 | 4.9 | — | 450/1 | 25 (Primol) | 400 |
| A*-2M | 2.0 (twice) | .23 | 4.9 | — | 450/1 | 200 (Primol) | 400 |
| A*-3M | 0.5 | .45 | 4.9 | 200 | 400/1 | 200 (Primol) | 400 |
| A*-4M | 2.0 (twice) | .23 | 4.9 | 200 | 400/1 | 200 (Primol) | 400 |
| A*-5M (pilot unit) | 2.0 (once) | .31 | 4.7 | 180 | 400 | 200 (Primol) | 400 |
| A*-6M (pilot unit) | 2.0 (once) | .36 | 4.9 | 200 | 400 | 200(hexane) | 400 |
| A*-7M (pilot unit) | 2.0 (once) | .31 | 4.7 | 200 | 400 | 200 (hexane) | 400 |
| A*-8M | 2.0 (twice) | .23 | 4.9 | 200 | 400 | at 325° C. in Western Canadian 600N after 14 hrs on oil | |

Some of the samples were heated in dry air in a 1 ft$^3$ muffle furnace for 1 hr. The dry air had no more than 50 ppm water and the flow rate was 3 ft$^3$/h. Each of these air calcined samples was removed from the furnace when hot then allowed to cool in moist laboratory air to room temperature.

Some other samples were not air calcined, but all of the samples, whether air calcined or not, were subsequently pressed, washed and screened to 7-14 mesh, loaded into a reactor and heated in dry $H_2$ up to 400° C. Silylation always followed this last drying step.

In all cases, except for Catalyst A*-8M which is described separately, HMDSO modification was conducted using a 5% solution of HMDSO in a solvent (Primol 185 white oil, or hexane, at elevated temperature and at an $H_2$ pressure of 50 psig. HMDSO solution was admitted at 15 v/v/hr until breakthrough then the rate of admission was reduced to 5 v/v/hr for 2.5 hr. Pure solvent was then introduced for 15 min. after which the $H_2$ gas rate was raised from 0 to 10 cfm after 1.5 hr the solvent was cut off and $H_2$ gas continued to flow through the reactor at the original silylation temperature for 1.5 hr. The temperature was then raised to 400° C. for 1 hr. A summary of silylation treatment conditions is presented in Table 2.

Following silylation, the reactor was then cooled to 200° C. and feedstock admitted. Conditions were 600 psig pure $H_2$ 1.0 v/v/hr at a $H_2$ rate of 5000 SCF/B for the lab unit and 3000 SCF/B for pilot unit.

IR. MONITORING OF ORGANOSILANE REACTIONS

Transmission infrared spectroscopy is an excellent tool for monitoring the changes in acid site type and density of zeolites because they are transparent to IR above 1300 cm$^{-1}$ where valence vibrations occur. Highly transmitting spectra of 40–50 mg 2.5 cm diameter discs of pressed catalyst can be obtained by evacuating the disc at 140° C. to remove physically and hydrogen bonded water. All spectra shown were recorded at room temperature on a Beckman 4240 IR spectrometer.

Silylation of Zeolite Y

FIGS. 1–4 demonstrate the importance of having reactive sites for silylation. FIG. 1 shows that vapor phase HMDSO does not react readily with a hydroxyl form zeolite Y when the hydroxyls are hydrogen bonded. It is seen that there is little or no change in the zeolitic hydroxyl band envelope centered around 3600 cm$^{-1}$. This broad feature (lack of distinct peaks) is indicative of interacting (hydrogen bonded) hydroxyl groups in the supercages and in the sub cages (truncated octahedra) of zeolite Y. Such hydrogen bonded hydroxyls are unreactive with the silylating agents, in this case HMDSO, and are believed to be caused (in this case) by the presence of moisture on the zeolite Y surface.

Figure 2:
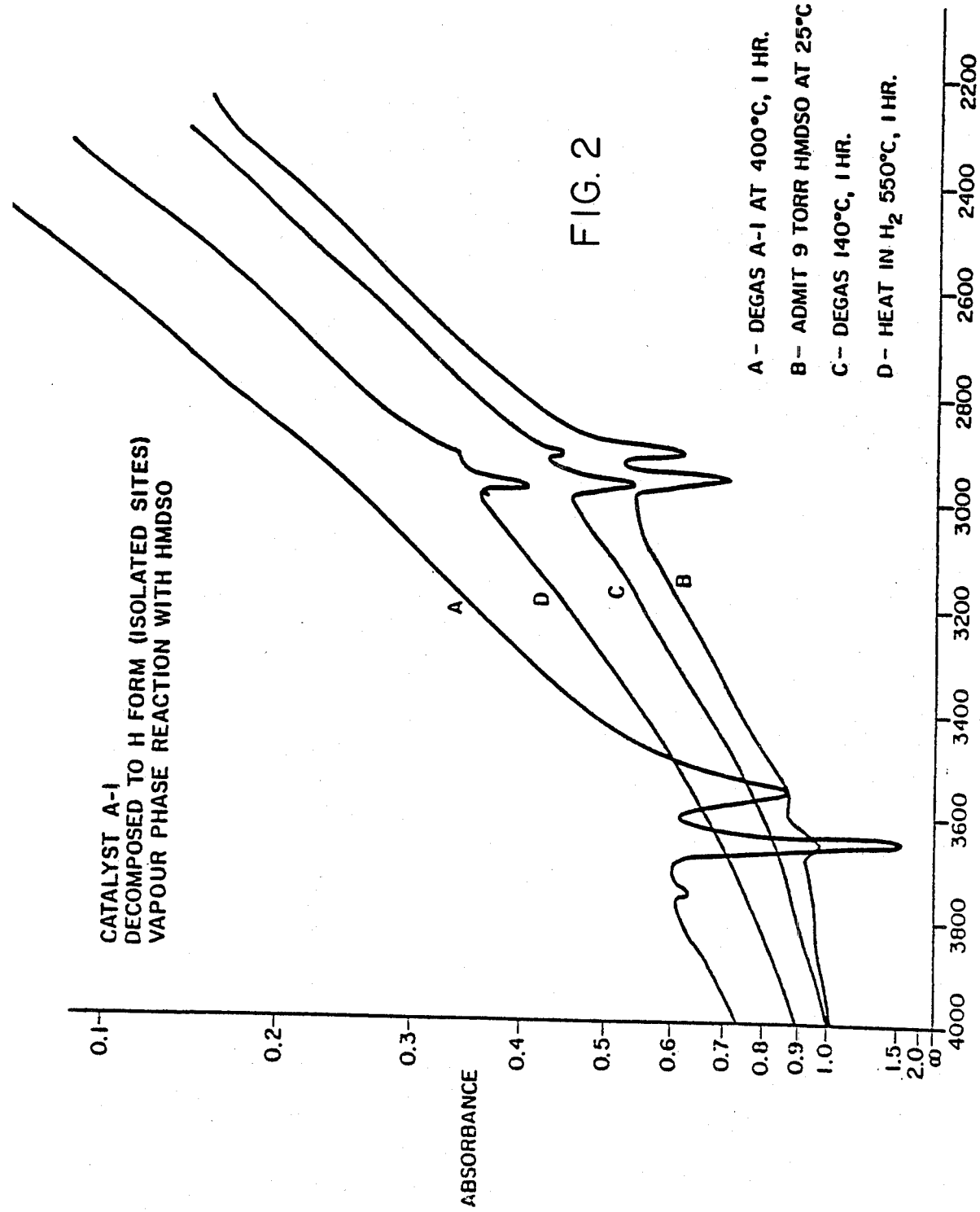
FIG. 2 shows the infrared spectrum of the vapor phase reaction of HMDSO with H-zeolite Y (containing isolated sites).

On the other hand, discrete non-interacting hydroxyl species were created by decomposing A-1, the NH$_4$ form zeolite Y under dry conditions (FIG. 2). The bands due to the stretching vibrations of external hydroxyls 3740 cm$^{-1}$, supercage hydroxyls 3650 cm$^{-1}$ and B cage hydroxyls 3550 cm$^{-1}$ have been identified before by Uytterhoeven et al (J. Phys Chem 69 (6) 2117 (1965)). Each species is clearly not hydrogen bonded and each reacts extensively with HMDSO at 25° C. as evidenced by the disappearance of the hydroxyl bands and the appearance of new bands at 2980 cm$^{-1}$ and 2920 cm$^{-1}$ due to C-H stretching modes.

Further degassing and heating completely eliminated all trace of the hydroxyl modes and the C-H bands declined in intensity due to condensation-polymerization.

Figure 3:
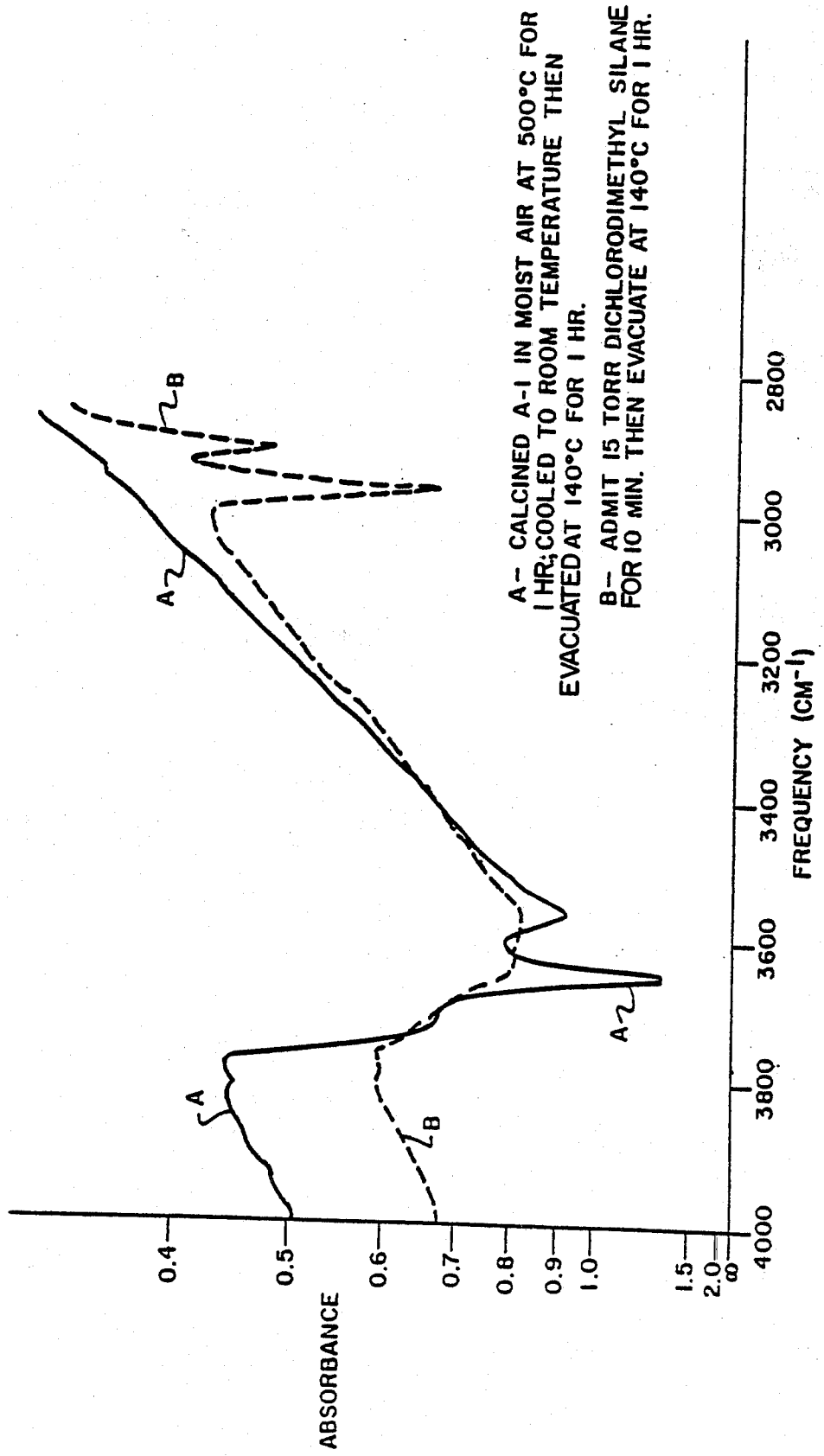
FIG. 3 shows the infrared spectrum of vapor phase reaction of dichlorodimethyl silane with H-zeolite Y containing mixed isolated and hydrogen bonded hydroxyls.

Another example of the effect of surface pretreatment of an A-1 material upon the extent of silylation is shown in FIG. 3.

A-1 was calcined in moist air (laboratory air containing ambient humidity) at 500° C. for 1 hr., cooled to room temperature (in effect generating A-2) then evacuated at 140° C. A mixed population of hydrogen bonded hydroxyls and isolated hydroxyls was generated (FIG. 3A). The population of isolated internal hydroxyls is considerably higher in the case of A-2 (NaY exchanged in 0.5 N ammonium nitrate) than for the example shown in FIG. 1 (NaY exchanged in 2.0 N ammonium nitrate). This surface was subsequently exposed to 15 torr of dichlorodimethylsilane vapor (a highly reactive silylating reagent) for 12 minutes at room temperature then again evacuated at 140° C. to 5×10$^{-3}$ torr for 1 hr. The isolated sites were completely eliminated and new bands appeared near 2980 and 2920 cm$^{-1}$ indicating silylation. However the population of hydrogen bonded hydroxyls was unchanged (FIG. 3B).

This example demonstrates that the co-generation of hydrogen bonded hydroxyls and isolated hydroxyls can be used as an accurate control of the extent of silylation, since it is clear that, of the two, only the isolated hydroxyls react with the silylating agent added to the system. The unreacted hydrogen bonded hydroxyls remain and could provide catalytic activity.

However, a surface containing hydrogen bonded hydroxyl species may be activated so as to be reactive with organosilanes. This is achieved by dehydroxylating these hydrogen bonded hydroxyl species.

Figure 4:
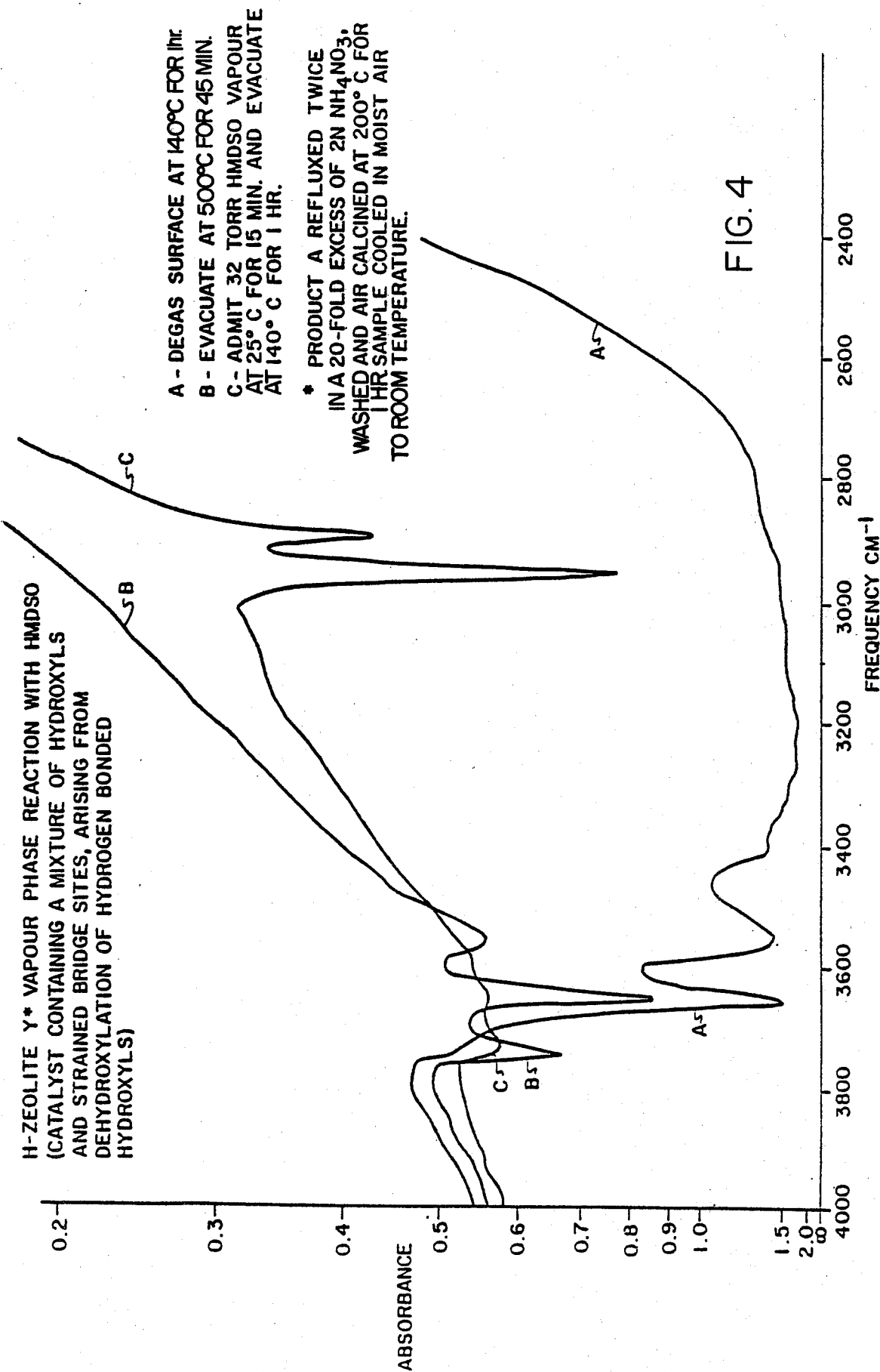
FIG. 4 shows the infrared spectrum of the vapor phase reaction of HMDSO with H-zeolite Y, containing reactive sites comprising a mixture of isolated hydroxyls and sites arising from dehydroxylation of hydrogen bonded hydroxyls.

This is demonstrated by FIG. 4. A surface containing a mixed population of isolated hydroxyls, NH$_4$+ and hydrogen bonded hydroxyls (FIG. 4A) was heated at high temperature (500° C.) for 45 minutes under vacuum (less than 10$^{-3}$ Torr) yielding a low population of isolated sites, no hydrogen bonded sites and by inference, a large population of strained bridge sites (FIG. 4B). That is, the surface has been dehydroxylated. Subsequent reaction of this surface with HMDSO vapor produced a large population of chemisorbed silyl species (bands at 2980 and 2920 cm$^{-1}$) which is substantially greater than would be expected had only the isolated species reacted. (Compare with the intensity of the 2980 and 2920 cm$^{-1}$ bands in FIG. 2C).

Thus, for the purposes of this specification, one or both of the two types of reactive sites should be generated to facilitate silylation.

Figure 5:
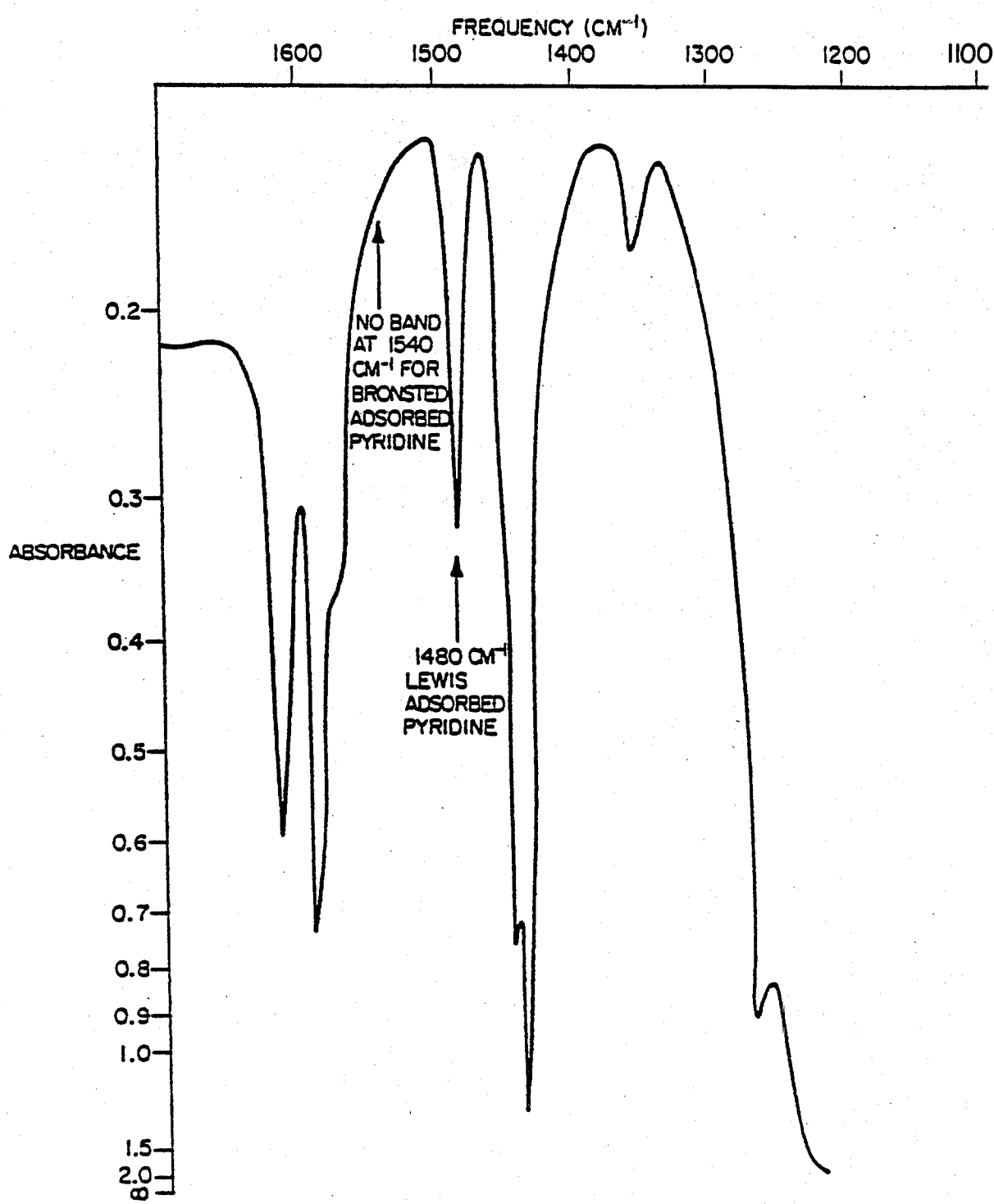
FIG. 5 shows infrared spectrum of the adsorption of pyridine on HMDSO modified catalyst A-1.

As evidence of the completeness of the silylation of decomposed A-1 (hydrogen form, isolated hydroxyls), by HMDSO, the subsequent adsorption of pyridine vapour by the modified surface showed that adsorption occurred as hydrogen-bonded pyridine and as Lewis adsorbed pyridine but there were no sites for Bronsted adsorption by proton exchange to form pyridinium ions (no band at 1540 cm$^{-1}$) (FIG. 5).

The possibility that all Bronsted sites can be eliminated in zeolite Y means that the hydrocracking potential of the zeolite may also be destroyed, because Bronsted sites are generally thought to be needed to initiate C-C cleavage reactions.

Therefore methods for preserving catalytically active hydroxyls are appropriate with zeolite Y and other low silica to alumina ratio zeolites so that the modified system can function as a surface which is both diffusionally selective and catalytically active.

In one scenario a form of Na zeolite Y could be partly exchanged, calcined to generate isolated hydroxyl sites, treated with a silylating agent under dry conditions, then re-exchanged to expose new sites.

The level of exchange (e.g. ammonium exchange) of the original cationic species (i.e. Na in the case of sodium Y) may also determine the population of isolated hydroxyl species and therefore the extent of hydroxyl silylation. If only a few hydroxyl sites are created they may be, statistically far enough apart not to hydrogen bond even if the decomposition takes place in moist air (see FIG. 3). At higher exchange levels more hydrogen bonded species will be formed if the surface is calcined and cooled under moist conditions following the exchange step.

A possible variation on this would be to use NH$_4$+ as the blocking ion. In this case, the population of NH$_4$+ relative to the acidic hydroxyl sites can be controlled by the calcining temperature. After silylation, the catalyst may be post calcined at eg 500° C. to restore sites, rather than require another exchange as in the Na blocking case.

In this case it would be important to insure that hydroxyl sites generated from NH$_4$+ decomposition were not all consumed by possible bridging reactions with neighboring silyl species.

A preferred way of preserving sites for hydrocracking activity of low SiO$_2$/Al$_2$O$_3$ ratio zeolite catalysts (eg zeolite Y) would be to generate a mixed population of hydrogen bonded hydroxyls and discrete (isolated) hydroxyl sites. A preferable method to accomplish this end would be to first partially decompose an NH$_4$+ form zeolite Y and expose the newly formed hydroxyls to moisture thereby creating hydrogen bonded hydroxyls. This is what is occurring with the catalysts of series A when calcination is conducted in moist air followed subsequently by the step of permitting the calcined material to come to room temperature in moist air. The same result would be achieved if the calcination was conducted under anhydrous conditions but the subsequent cooling were conducted in the presence of a moist atmosphere, for example, moist air (laboratory air containing ambient humidity) or some other atmosphere into which moisture has been introduced. If the calcination was in a moist atmosphere, subsequent cooling could be in a dry atmosphere. Preferably at least the cooling is in a moist atmosphere or the zeolite is at least permitted to equilibrate in a moist atmosphere after calcination and cooling. The amount of moisture and the duration of exposure of the zeolite to the moist atmosphere will determine the extent to which the hydroxyl groups which are generated will be in the hydrogen bonded form. Subsequent drying of this surface and decomposition of the remaining NH$_4$+ sites in a dry environment will generate other hydroxyls which are isolated (nonhydrogen bonded) as well as strained bridge sites from dehydroxylation of hydrogen bonded hydroxyl sites. Both of these sites are available for reaction with HMDSO or other silylating agents providing dry conditions are maintained.

The ratio of hydrogen bonded to reactive sites (isolated hydroxyls and strained bridge sites) will determine the extent of silyation. The hydrogen bonded hydroxyls remain after silylation and are effective as sites for hydrocracking. It is left to the practitioner to determine the degree and extent of generation of hydrogen bonded hydroxyls as may be required by his specific application. All that is required however is that there be some protected, hydrogen bonded hydroxyls which are unreactive with silylating agent and that there be some reactive sites (isolated hydroxyls and/or strained bridge sites) generated which are reactive with silylating agents.

It should be noted that all silylating reactions were performed on metal loaded zeolite Y, however this is not critical to the successful practice of the invention. The reactivity and extent of reaction of Y type materials with HMDSO was independent of the presence of this metal, at least up to Pd loadings of 0.5 wt%.

Catalytic Dewaxing

The following examples demonstrate that Pd zeolite Y catalysts can be changed from non-selective hydrocracking catalysts into catalysts which will selectively dewax lubricating oils. The examples support the spectroscopic evidence presented above, as well as showing some other limitations. They indicate that:

(a) The NH$_4$+ form zeolite Y surfaces which are air calcined without subsequent drying, will not react extensively with the silylating agent HMDSO.

(b) The NH$_4$+ form zeolite Y surfaces which are heated in a dry atmosphere, then silylated, are not effective catalysts.

(c) The most effective catalysts are those that are first air calcined in a moist environment (or air calcined in a dry environment then exposed to moisture), dried at a temperature of about 300–350 and above, then silylated.

Performance of Untreated Catalysts A-2 and A*-1

Example 1; Catalyst A-2

The untreated catalyst, A-2 was contacted with a Western Canadian 600N waxy raffinate at 300°, 325° and 370° C. at 4.14 MPag H$_2$ and 1.0 v/v/h (Table 3). The oily fraction remaining, i.e. the stripped products, were still very waxy, indicative of a process which is not shape selective for charge molecules.

TABLE 3

PERFORMANCE OF CATALYST A-2 ON WESTERN CANADIAN 600N

| CATALYST | A-2 | | |
|---|---|---|---|
| Time on Stream, (h) | 216–232 | 240–264 | 288–320 |
| Temperature °C. (reactor) | 300 | 325 | 370 |
| Pressure, (psig) | 600 | | |
| LHSV, v/v/h | 1.0 | | |
| Excess Gas Rate, SCF/bbl | 5000 | | |
| Average Yield, wt %[1] | 80 | 75 | 35 |
| Pour Point, °C. | 50 | 50 | 56 |
| Wax Content[2], wt % | 18.9 | — | |
| Refractive Index at 60° C. | 1.4644 | 1.4628 | 1.4580 |

[1]Yield of product boiling above the ibp of the feed stock (356° C.)
[2]Calculated for products filtered at −5° C. from 1:1 MEK:MiBK; 2:1 Solvent:Oil In fact the SiO$_2$ gel separations and a measured wax content by solvent separation showed that A-2 is actually anti-selective for wax because the products had a higher concentrations of saturates than the feed. Aromatics and polars were preferentially reacted. Since aromatics and polars are generally among the bulkier molecular species in the feedstock, it is to be expected that the fraction of product boiling roughly in the same range as the feed should be low because molecules of all sizes and types have access to the hydrocracking surface.

At 370° C. reactor temperature the oil yield is only 35%. These results are entirely predictable for a large pore hydrophilic, acidic surface. Note that this catalyst contains some interacting sites and some dehydroxylated sites since it was calcined in moist air before drying.

Example 2, Catalyst A*-1

Like Catalyst A-2, the untreated catalyst A*-1 is also a poor hydrodewaxing catalyst but unlike A-2 it is also a poor hydrocracking catalyst in general (Table 4). That is, there is very little conversion of Western Canadian 600N by hydrocracking of any molecular type. Since catalyst A*-1 contains mostly only isolated sites (it was not air calcined) it is apparent that these alone are ineffective in catalysing hydrocracking reactions. The superior hydrocracking activity of A-2 is apparently connected with the air calcination/exposure to moisture steps used in its preparation which creates interacting hydroxyl sites. It is these sites that are required for hydrocracking activity.

TABLE 4

Performance of Catalyst A*-1 on Western Canadian 600N

| Catalyst Activation Features | Not air calcined, reduced in H₂ at 400° C. | | | |
|---|---|---|---|---|
| Time on stream (h) | 19–22 | 26–29 | 33–36 | 47–50 |
| Reactor Temperature °C. | 350 | 350 | 370 | 390 |
| Pressure of $H_2$ (psig) | 600 | 600 | 600 | 600 |
| Gas Rate (SCF/B) | 5000 | 5000 | 5000 | 5000 |
| Liquid velocity (v/v/h) | 1.0 | 1.0 | 1.0 | 1.0 |
| Yield of ibpt wt %[1] | 92 | 93 | 88 | 84 |
| Solid point °C. | 48 | 49 | 47 | 49 |

[1] Yield of product boiling above the ibp of the feed stock (356° C.)

Performance of Silylated Catalysts

Example 3, Catalysts A*-1M and A*-2M

These catalysts are only marginally active hydrocracking catalysts and show only minor pour point reduction (in the case of A*-2M) on Western Canadian 600N. (Table 5)

Neither catalyst was air calcined or exposed to moisture prior to silylation, so that the sites responsible for hydrocracking were not generated.

Considerable silylation may have occurred in both these catalysts but since there are few available catalytically active sites they are unsuitable in hydrocracking type applications.

TABLE 5

PERFORMANCE OF CATALYSTS A*-1M AND A*-2M ON WESTERN CANADIAN 600N

| Catalyst | A*-1M | | A*-2M | | |
|---|---|---|---|---|---|
| Activation Features | Heated only in $H_2$ up to 450° C.; not air calcined | | Heated only in $H_2$ up to 450° C.; not air calcined | | |
| Silylation treatment | 5% HMDSO in Primol 185 at 25° C. | | 5% HMDSO in Primol 185 at 200° C. | | |
| Time on stream, hrs | 4–7 | 11–14 | 3–6 | 9–12 | 23–26 |
| Reactor Temperature, °C. | 300 | 350 | 300 | 350 | 390 |
| Pressure of $H_2$ (PSIG) | 600 | 600 | 600 | 600 | 600 |
| Gas Rate (SCF/B) | 3000 | 3000 | 3000 | 3000 | 3000 |
| Liquid Velocity (v/v/hr) | 1.0 | 1.0 | 1.0 | 1.0 | 1.0 |
| Yield of total liquid product, wt % | 97 | 98 | 96 | 94 | 90 |
| Yield of ibp+, wt %[1] | 95 | 95 | 95 | 92 | 88 |
| Solid point, °C. | 49 | 49 | 50 | 48 | 45 |

[1] Yield of product boiling above the ibp of the feed stock (356° C.)

Example 4, Catalyst A-1M(a)

The A-1 material was actually modified twice. Material A was first modified following calcination in moist air at 250° C. Based on the results shown in examples 1 and 2 it is expected that the catalyst should possess active hydrocracking sites. However, the surface was not adequately dried prior to silylation, being heated in dry $N_2$ and dry $H_2$ at only 200° C. Under these circumstances, it is expected that a large population of interacting sites will exist prior to and during the silylation treatment. On the basis of IR studies, silylation by HMDSO should be minimal.

Indeed, as is shown in Table 6, A-1M(a) is an active hydrocracking catalyst but is only slightly selective in removing wax from Western Canadian 600N. Except for a slight pour reduction A-1M(a) behaves much like the untreated catalyst A-2.

Example 5, Catalyst A-1M(b)

This example demonstrates that a surface containing mostly interacting sites (A-1M(a)) can be very readily dehydroxylated at the conditions of drying typically associated with the hydrocracking environment. A second treatment of A-1M(a) with HMDSO following 160 hrs on Western Canadian 600N renders the catalyst (A-1M(b)) active for hydrodewaxing (Table 6).

Much more silylation occurs with the second treatment because many of the interacting hydroxyl sites which did not react with HMDSO in (A-1M(a)) are dehydroxylated during the 160 hr on stream at 350° C. so that surface is then readily silylated (A-1M(b)).

The result is a dramatic improvement in performance. The oil product yield was relatively high and the pour point dropped to −2° C. at a mild reactor condition (350° C.). In this form zeolite Y behaves as a selective hydrodewaxing catalyst and the relatively low reactor temperature required is evidence that excellent catalytic sites have been preserved.

TABLE 6

Performance of Catalyst A-1M(a) and A-1M(b) on Western Canadian 600N.

| Catalyst | A-1M(a) | A-1M(b) |
|---|---|---|
| Activation Features | Air calcined at 250° C. Dried in $H_2$ at only 200° C. | |
| Silylation Treatment | 5% HMDSO in Primol 185 at 40° C. | 5% HMDSO in Western Canadian 600N after 160 h on stream at 250° C. |
| Time on stream (h) | 130–160 | 200–230 |
| Reactor Temperature (°C.) | 350 | 350 |
| Pressure of $H_2$ (psig) | 600 | 600 |
| Gas Rate (SCF/B) | 5000 | 5000 |
| Liquid Velocity (v/v/hr) | 1.0 | 1.0 |
| Yield of ibp +[1] (wt %) | 45 | 62 |
| Pour Point (°C.) | 48 | −2 |
| Wax Content[2] | — | <1 |

[1] Yield of product boiling above the ibp of the feedstock (356° C.)
[2] Calculated for products filtered at −5° C. from 1:1 MEK:MiBK; 2:1 Solvent:Oil The following examples demonstrate the preferred procedure of air calcining and cooling the $NH_4$ form of zeolite Y (whereby at either or both of these stages the catalyst is exposed to moist air) then heating in a dry environment at about 350° C. or above prior to silylation.

Example 6, Catalysts A*-b 3M and A*-4M

Catalysts A*-3M and A*-4M were tested for catalytic dewaxing activity on a number of different waxy feeds over a range of temperatures. (Tables 7 and 8). Even though these two catalysts were derived from materials having different levels of exchange (A*-3M has Na/Al=0.45; A*-4M has Na/Al=0.23) they both exhibited catalytic activity and, in the case of the Western Canadian waxy oil they performed similarly (A*-3M was about 20° C. less active than A*-4M). In both instances, the catalysts had been dry air calcined, then permitted to equilibrate to room temperature in moist air. They were then heated in $H_2$ to 400° C. The resulting materials were significantly silylated, yet also possessed catalytically active sites and therefore behaved as active hydrodewaxing catalysts.

TABLE 7

PERFORMANCE OF CATALYST A*-3M ON WESTERN CANADIAN FEEDSTOCKS

| Catalyst | A*-3M | | | | | | | |
|---|---|---|---|---|---|---|---|---|
| Activation features | Air calcined at 200° C., cooled, cooled to R.T. in moist air then heated up to 400° C. in $H_2$ | | | | | | | |
| Silylation treatment | 5% HMDSO in Primol 185 at 200° C. | | | | | | | |
| Feedstock | Western Canadian 600N | | | | Western Canadian 150N | | | |
| Time on stream hrs | 12–14 | 18–21 | 25–28 | 32–35 | 39–42 | 53–56 | 67–70 | 74–77 |
| Reactor Temperature, °C. | 390 | 390 | 390 | 390 | 390 | 370 | 380 | 380 |
| Pressure of $H_2$ (PSIG) | 600 | 600 | 600 | 600 | 600 | 600 | 600 | 600 |
| Gas Rate (SCF/B) | 3000 | 3000 | 3000 | 3000 | 3000 | 3000 | 3000 | 3000 |
| LHSV (v/v/hr) | 1.0 | 1.0 | 1.0 | 1.0 | 1.0 | 1.0 | 1.0 | 1.0 |
| Yield of total liquid product wt % | 52 | 57 | 61 | 62 | 64 | 78 | 64 | 66 |
| Yield of Ibp, wt %[1] | 48 | 53 | 57 | 60 | 62 | 76 | 61 | 63 |
| Pour point, °C. | −1 | −5 | 0 | −3 | 0 | 0 | 0 | −3 |
| Solid point, °C. | | −8 | −3 | −6 | −3 | −3 | −3 | −6 |
| Viscosity cSt @ 40° C. | | | | 174.66 | | | | 34.84 |
| Viscosity cSt @ 100° C. | | | | 13.94 | | | | 5.36 |
| VI | | | | 68 | | | | 80 |

[1] Yield of product boiling above the ibp of the feed stock

TABLE 8

PERFORMANCE OF CATALYST A*-4M ON LIGHT AND HEAVY LUBE FEEDSTOCKS

| Catalyst | A*-4M | | | | | | | | | | | |
|---|---|---|---|---|---|---|---|---|---|---|---|---|
| Activation features | Heated in air at 200° C., cooled, to R.T. in moist air then heated up to 400° C. in $H_2$ | | | | | | | | | | | |
| Silylation treatment | 5% HMDSO in Primol 185 at 200° C. | | | | | | | | | | | |
| Feedstock | Western Canadian 600N | | | | Western Canadian 150N | | | Naphthenic Oil | | Bright Stock | | |
| Time on stream hrs | 4–7 | 11–14 | 18–21 | 25–88 | 32–35 | 39–42 | 46–68 | 53–56 | 60–63 | 67–70 | 74–77 | 81–80 |
| Temperature, °C. | 350 | 370 | 370 | 370 | 350 | 350 | 370 | 340 | 350 | 370 | 390 | 420 |
| Pressure of $H_2$ (PSIG) | 600 | 600 | 600 | 600 | 600 | 600 | 600 | 600 | 600 | 600 | 600 | 600 |
| Gas Rate (SCF/B) | 3000 | 3000 | 3000 | 3000 | 3000 | 3000 | 3000 | 3000 | 3000 | 3000 | 3000 | 3000 |
| LHSV (v/v/hr) | 1.0 | 1.0 | 1.0 | 1.0 | 1.0 | 1.0 | 1.0 | 1.0 | 1.0 | 1.0 | 1.0 | 1.0 |
| Yield of total liquid product wt % | 74 | 60 | 62 | 63 | 73 | 74 | 57 | 89 | 83 | 79 | 77 | 64 |
| Yield of Ibp, wt %[1] | 71 | 57 | 60 | 61 | 70 | 72 | 54 | 86 | 78 | 77 | 76 | 62 |
| Pour point, °C. | 12 | −6 | −3 | −3 | 6 | 3 | −21 | −21[4] | −30 | 21 | 9 | 9 |
| Solid point, °C. | 9 | −9 | −6 | −6 | 3 | 0 | −24 | −24 | −33 | 18 | 6 | 6 |
| Viscosity cSt @ 40° C. | 149.65 | | | 179.43 | | 34.05 | 46.63 | 103.56 | | | | |
| Viscosity cSt @ 100° C. | 12.91 | | | 14.24 | | 5.36 | 6.05 | 10.02 | | | | |
| Vi | 73 | | | 69 | | 86 | 61 | 69 | | | | |

[1] Yield of product boiling above the ibp of the feed stock

Example 7 Catalysts A*-5M and A*-6M

This example demonstrates that there is a minimum effective air calcination temperature requirement when subsequently silylating with HMDSO. Both A*-5M and A*-6M had hydrodewaxing activity on a Western Canadian 150N (Table 9) but A*-6M was the more selective ie a higher dewaxed oil yield was obtained for a given product pour point. The air calcination temperature of 180° C. used in making A*-5M prior to the HMDSO silylation step is not high enough. Much better performance is produced (in A*-6M) by air calcining at 200° C. in the preliminary activation sequence.

TABLE 9

PERFORMANCE OF CATALYST A*-5M and A*-6M ON WESTERN CANADIAN 150N

| Catalyst | A*-5M | | | | A*-6M | |
|---|---|---|---|---|---|---|
| Activation features | Heated in air at 180° C., cooled, then heated in $H_2$ at 400° C. | | | | Heated in air at 200° C., cooled, then heated at 400° C. in $H_2$ | |
| Silylation treatment | 5% HMDSO in Primol 185 at 200° C. | | | | 5% HMDSO in Primol 185 at 200° C. 150N raffinate | |
| Time on stream hrs | 97–117 | 133–145 | 169–193 | 197–209 | 390–406 | 438–450 |
| Reactor Temperature, °C.[1] | 350 | 375 | 390 | 390 | 335 | 335 |
| Pressure of $H_2$ (PSIG) | 600 | 600 | 600 | 600 | 600 | 600 |
| Gas Rate (SCF/B) | 5000 | 5000 | 5000 | 5000 | 5000 | 5000 |
| LHSV (v/v/hr) | 1.0 | 1.0 | 1.0 | 1.0 | 1.0 | 1.0 |
| Yield of ibp+, wt %[1] | 83 | 68 | 55 | 51 | 75 | 78 |
| Pour point, °C. | +27 | +12 | +3 | +6 | 0 | 6 |
| Solid point, °C. | — | — | — | — | −3 | 3 |
| Viscosity cSt @ 40° C. | | | 35.70 | | 37.99 | 35.19 |
| Viscosity cSt @ 100° C. | | | 5.67 | | 5.91 | 5.17 |
| VI | | | 96 | | 97 | 101 |

[1] Total liquid product stripped to ibp of feed

Example 8, Catalyst A*-7M

This example shows that the solvent used to transport the silylating agent can be a light hydrocarbon, in this case n-hexane. Again an active hydrodewaxing catalyst was obtained following silylation with HMDSO (Table 10).

TABLE 10
PERFORMANCE OF CATALYST A*-7M ON WESTERN CANADIAN 150N

| Catalyst | A*-7M Na/Al = 0.31 | | | | | |
|---|---|---|---|---|---|---|
| Activation features | Air calcined at 200° C., cooled, reduced in H₂ at 400° C. | | | | | |
| Silylation treatment | 5% HMDSO in n-Hexane at 200° C. | | | | | |
| Time on stream hrs | 97–111 | 115–135 | 139–159 | 163–179 | 183–219 | 227–259 |
| Reactor Temperature, °C. | 325 | 350 | 375 | 365 | 365 | 365 |
| Pressure of H₂ (PSIG) | 600 | 600 | 600 | 600 | 600 | 600 |
| Gas Rate (SCF/B) | 5000 | 5000 | 5000 | 5000 | 5000 | 5000 |
| LHSV (v/v/hr) | 1.0 | 1.0 | 1.0 | 1.0 | 1.0 | 1.0 |
| Yield of ibp +, wt %[1] | 86 | 72 | 54 | 65 | 69 | 75 |
| Pour point, °C. | 25 | 9 | −27 | −15 | −9 | 12 |
| Viscosity cSt @ 40° C. | | | | | 41.9 | |
| VI | | | | | 89 | |

[1] Total liquid product stripped to ibp of feed

Example 9, Catalyst A*-8M

This example demonstrates that sites for silylation may still exist even after the catalyst has been on stream at hydrocracking conditions on a Western Canadian 600N (Table 11).

The sample was tested in both an unmodified and in a modified form. In the unmodified form it behaved as an active but non-selective hydrocracking catalyst. After 14 hrs on feed the catalyst was modified using 5% by vol. of HMDSO in 600N oil (as solvent at 325° C. When fresh feed was introduced at 350° C. the now modified catalyst was selective. This demonstrates that in situ silylation of the zeolite Y is possible. This zeolite Y base had been dry air calcined then allowed to equilibrate to RT in moist air then heated in H₂ at 400° C. Both silylatable and catalytically active hydroxyls were generated on the zeolite surface, and the zeolite remains silylatable even after its hydroxyls have participated in catalyts.

TABLE 11
PERFORMANCE OF CATALYST A*-8M ON WESTERN CANADIAN 600N

| Catalyst | A*-8M Na/Al = 0.23 | | | | |
|---|---|---|---|---|---|
| Activation Procedure | Air calcined at 200° C. then cooled to R.T. in moist air, reduced in H₂ at 400° C. | | | | |
| Silylation Treatment | 5 vol % HMDSO in Western Canadian 600N at 325° C. (treatment after 14 hr on stream) | | | | |
| Feedstock | Western Canadian 600N | | | | |
| hrs on stream | 4–7 | 11–14 HMDSO | 28–31 | 35–38 | 42–45 |
| Temperature | 300 | 325 TREAT | 350 | 335 | 335 |
| Pressure of H₂ (PSIG) | 600 | 600 | 600 | 600 | 600 |
| Gas Rate (SCF/B) | 3000 | 3000 | 3000 | 3000 | 3000 |
| LHSV (v/v/hr) | 1.0 | 1.0 | 1.0 | 1.0 | 1.0 |
| Total Liquid Prod. Yield wt % | 85 | 59 | 54 | 63 | 63 |
| Yield of ibp +[1] | 78 | 51 | 52 | 61 | 61 |
| Pour Point | — | — | −12 | −3 | −3 |
| Solid Point | 50 | 48 | −15 | −6 | −6 |

[1] Yield of product boiling above the ibp of the feed stock (356° C.)

What is claimed is:

1. A method for surface modifying a large pore zeolite so as to produce a material retaining sufficient catalytically active sites to be suitable for use as a catalyst, which method comprises chemically modifying said large pore zeolite by reacting said zeolite under anhydrous conditions with an organosilane wherein the starting zeolite to be modified possesses sites some of which are available for reaction with the organosilane and wherein some of the sites have been protected to prevent reaction with the organosilane and wherein the organosilane is capable of entering into the channels of the zeolite and reacting with the available reactive sites present therein as well as reacting with reactive sites present on the external surface of said zeolite.

2. The method of claim 1 wherein the protected sites which are prevented from reacting with the organosilane have been produced by the procedure of first calcining and cooling a cation exchanged zeolite either or both of such steps of calcination and cooling being conducted in the presence of a moist atmosphere followed by calcining and cooling under anhydrous conditions to yield a mixed population of protected, available and catalytically active sites on the zeolite prior to reacting said zeolite under anhydrous conditions with the organosilane.

3. The method of claim 1 wherein the protected sites which are prevented from reacting with the organosilane have been produced by the procedure of first calcining and cooling a cation exchanged zeolite in an anhydrous atmosphere and then exposing such zeolite to a moist atmosphere, followed by calcining and cooling the zeolite under anhydrous conditions to yield a mixed population of protected, available and catalytically active sites on the reactive zeolite prior to reacting said zeolite under anhydrous conditions with the organosilane.

4. The method of claim 2 wherein the first calcination is at a temperature of about 180° C. and greater.

5. The method of claim 3 wherein the first calcination is at a temperature of about 180° C. and greater.

6. The method of claim 2 wherein the cation exchanged zeolite is an ammonium form zeolite and wherein said first calcination is at a temperature of about 200° C. or higher and said subsequent anhydrous calcination is to a temperature of about 300° C. and higher.

7. The method of claim 3 wherein the cation exchanged zeolite is an ammonium form zeolite and wherein said first calcination is at a temperature of about 200° C. and higher and said subsequent anhydrous calcination is to a temperature of about 300° C. and higher.

8. A method for surface modifying a large pore zeolite so as to produce a material retaining sufficient catalytically active sites to be suitable for use as a catalyst, which method comprises partially cation exchanging the zeolite, calcining and cooling under anhydrous conditions, reacting said zeolite under anhydrous conditions with an organosilane capable of entering into the channels of the zeolite and reacting with the reactive sites present therein as well as reacting with reactive sites present on the external surface of said zeolite, reexchanging the silylated zeolite and calcining in moist atmosphere the reexchanged zeolite to generate new sites which are catalytically active.

9. The method of claim 1, 2, 3, 4, 5, 6, 7 or 8 wherein the silylated zeolite is heated in an inert or reducing atmosphere at from 300° to 500° C. to promote condensation-polymerization of the silylated surface.

10. The method of claim 9 wherein the large pore zeolite is any natural or synthetic zeolite having an average pore diameter of from about 7 Å or greater.

11. The method of claim 10 wherein the large pore zeolite is Zeolite Y.

12. The method of claim 11 wherein silylation is performed by contacting the zeolite and the organosilane in the vapor or liquid form or dissolved in a dry non reactive organic solvent, at from 20° to 500° C.

13. The method of claim 12 wherein the organosilane is dissolved in the dry, non reactive organic solvent at a concentration of from 0.01 to 20 vol.% silane.

14. The method of claim 13 wherein the organosilane employed has the formula $$SiR_yX_{4-y} \text{ or } (R_wX_{3-w}Si)_2-Z$$

wherein R is H or a $C_1$–$C_{10}$ alkyl, aryl, alkoxy or aralkyl, X is halogen, Z is 0 or NH or substituted amines or amides and Y is 1 to 4 and w=1 to 3.

15. The method of claim 14 wherein the organosilane is hexamethyl disilazane (HMDS) or hexamethyl disiloxane (HMDSO).

16. The method of claim 15 wherein, either before or after silylation the zeolite has associated therewith a catalytically active hydrogenating component.

17. The method of claim 16 wherein the catalytically active hydrogenating component is selected from the group consisting of Group VI and Group VIII metals, their oxides and sulfides and mixtures thereof.

18. The method of claim 17 wherein the catalytically active hydrogenating component is present in the range of 0.1 to 2.0 wt.% based on dry zeolite.

19. The method of claim 18 wherein the catalytically active hydrogenating component is platinum or palladium.

* * * * *